(12) United States Patent
Koga et al.

(10) Patent No.: US 9,934,907 B2
(45) Date of Patent: Apr. 3, 2018

(54) LAMINATED CERAMIC ELECTRONIC COMPONENT AND MANUFACTURING METHOD THEREFOR

(71) Applicant: Murata Manufacturing Co., Ltd., Nagaokakyo-shi, Kyoto-fu (JP)

(72) Inventors: Seiji Koga, Nagaokakyo (JP); Takashi Omori, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 108 days.

(21) Appl. No.: 14/739,424

(22) Filed: Jun. 15, 2015

(65) Prior Publication Data

US 2015/0279570 A1  Oct. 1, 2015

Related U.S. Application Data

(63) Continuation of application No. PCT/JP2013/075783, filed on Sep. 25, 2013.

(30) Foreign Application Priority Data

Dec. 18, 2012 (JP) .................................. 2012-275525

(51) Int. Cl.
*H01G 4/30* (2006.01)
*H01G 4/232* (2006.01)
(Continued)

(52) U.S. Cl.
CPC ............... *H01G 4/30* (2013.01); *H01G 4/012* (2013.01); *H01G 4/1227* (2013.01);
(Continued)

(58) Field of Classification Search
CPC ............ H01G 4/30; H01G 4/008; H01G 4/12; H01G 4/012; H01G 4/1227; H01G 4/08; H01G 4/228
See application file for complete search history.

(56) References Cited

U.S. PATENT DOCUMENTS 5,534,843 A  7/1996 Tsunoda et al.
5,742,473 A *  4/1998 Sano .................... C04B 35/468
                                                    361/303
(Continued)

FOREIGN PATENT DOCUMENTS

CN           1216388 C    8/2005
JP       H06-231906 A    8/1994
(Continued)

OTHER PUBLICATIONS

International Search Report for PCT/JP2013/075783, dated Oct. 29, 2013.
(Continued)

*Primary Examiner* — Nguyen Ha
(74) *Attorney, Agent, or Firm* — Arent Fox LLP

(57) ABSTRACT

An external electrode included in a laminated ceramic electronic component is formed on a ceramic body by baking a conductive paste including a glass component. The ceramic body with the conductive paste applied thereto is subjected to heat treatment under the conditions where the top temperature is 800° C. or higher, and the electromotive force at the top temperature is 600 to 900 mV. In this heat treatment, the glass component in the conductive paste penetrates into grain boundaries between ceramic grains of the ceramic body, and a crystalline substance containing elements constituting the glass component is generated which has dissolving resistance against plating solutions.

15 Claims, 4 Drawing Sheets

(51) Int. Cl.
  *H01G 4/12*  (2006.01)
  *H01G 4/012* (2006.01)
  *H01G 4/248* (2006.01)

(52) U.S. Cl.
  CPC ........... *H01G 4/232* (2013.01); *H01G 4/2325* (2013.01); *H01G 4/248* (2013.01); *H01G 4/12* (2013.01); *Y10T 29/435* (2015.01)

(56) References Cited

U.S. PATENT DOCUMENTS

| | | | |
|---|---|---|---|
| 6,673,461 B2 | 1/2004 | Chazono et al. | |
| 2001/0036054 A1 | 11/2001 | Chazono et al. | |
| 2004/0105214 A1* | 6/2004 | Nakamura | H01G 4/30 361/321.2 |
| 2012/0075770 A1* | 3/2012 | Banno | B82Y 30/00 361/321.4 |
| 2012/0288724 A1* | 11/2012 | Ogawa | C23C 26/00 428/457 |

FOREIGN PATENT DOCUMENTS

| | | |
|---|---|---|
| JP | 2002-293620 A | 10/2002 |
| JP | 2009-200383 A | 9/2009 |
| JP | 4577461 B2 | 11/2010 |
| JP | 2011-124403 A | 6/2011 |
| WO | WO 2012/114784 A1 | 8/2012 |

OTHER PUBLICATIONS

Written Opinion of the International Seaching Authority for PCT/JP2013/075783, dated Oct. 29, 2013.

* cited by examiner

US 9,934,907 B2

LAMINATED CERAMIC ELECTRONIC COMPONENT AND MANUFACTURING METHOD THEREFOR

CROSS REFERENCE TO RELATED APPLICATIONS

The present application is a continuation of International application No. PCT/JP2013/075783, filed Sep. 25, 2013, which claims priority to Japanese Patent Application No. 2012-275525, filed Dec. 18, 2012, the entire contents of each of which are incorporated herein by reference.

FIELD OF THE INVENTION

The present invention relates to a laminated ceramic electronic component and a method for manufacturing the laminated ceramic electronic component, and more particularly, to a laminated ceramic electronic component that has an external electrode formed by heat treatment (baking) of a conductive paste containing a glass component, and a method for manufacturing the laminated ceramic electronic component.

BACKGROUND OF THE INVENTION

For laminated ceramic capacitors mounted with the use of soldering, wet plating such as electrolytic plating is typically applied onto external electrodes formed by baking to form, for example, Ni plating and Sn plating thereon, thereby providing improvements in mountability, more specifically, improvements in solderability to the external electrodes.

However, it is known that the plating solutions used for carrying out wet plating as described above have unfavorable influences on ceramic electronic components such as laminated ceramic capacitors to varying degrees.

The unfavorable influences mentioned above often appear as decreased mechanical strength of ceramic electronic components, such as crack generation during deflection of mounting substrates, reflow, or mounting. This will be described with reference to FIGS. 4 and 5.

FIGS. 4 and 5 show, in planar view, the appearance of a laminated ceramic capacitor 1 as an example of a laminated ceramic electronic component. The laminated ceramic capacitor 1 includes a ceramic body 2 in the shape of a cuboid. The ceramic body 2 has a plurality of stacked ceramic layers, and internal electrodes, not shown, arranged along the number of interfaces between the ceramic layers.

External electrodes 3 and 4 are formed on a pair of end surfaces of the ceramic body 2, which are opposed to each other. The external electrodes 3 and 4 are electrically connected to the internal electrodes. The external electrodes 3 and 4 have respective end edges 5 and 6 located on a pair of principal surfaces 7 and 8 of the ceramic body 2, which are opposed to each other, as well as a pair of side surfaces 9 and 10 thereof, which are opposed to each other.

On the external electrodes 3 and 4, plating films 11 and 12 are formed by wet plating as shown in FIG. 5. FIG. 4 shows a state before the formation of the plating films 11 and 12.

It has been determined that the crack generation mode differs between before plating and after plating, by a deflection test for measuring deflecting strength of this laminated ceramic capacitor 1. More specifically, before the plating, a crack 13 is likely to be caused so as to cross a central part of the ceramic body 2 as shown in FIG. 4. On the other hand, after the plating, a crack 14 that begins at sites of the ceramic body 2 with the end edges 5 and/or 6 of the external electrodes 3 and/or 4 located is likely to be generate in the ceramic body 2 as shown in FIG. 5.

From the foregoing, the plating solutions can be assumed to deteriorate the ceramic body 2, in particular, at parts with the end edges 5 and 6 of the external electrodes 3 and 4 located. This will be described with reference to FIG. 6.

FIG. 6 is a cross-sectional view illustrating an enlarged part of the laminated ceramic capacitor 1, which schematically shows a portion of the ceramic body 2 with the end edge 5 of the external electrode 3 located. The illustration of the plating films 11 and 12 is omitted in FIG. 6.

As shown in FIG. 6, the glass component contained in a conductive paste produces a glass phase 15 in the external electrode 3, when heat treatment is carried out. The glass phase 15 is distributed at more than one site in the external electrode 3. Furthermore, in the heat treatment step, the glass component in the conductive paste penetrates into grain boundaries 17 between ceramic grains 16 of the ceramic body 2 to form a reaction phase 18. Although not shown in FIG. 6, a similar phenomenon is also caused on the other side with the external electrode 4, as in the case of the side with the external electrode 3 as shown.

Then, when a plating step is carried out for forming the plating films 11 and 12 shown in FIG. 5, the glass component that penetrates into the grain boundaries 17 between the ceramic grains 16 and is located near the end edges 5 and 6 of the external electrodes 3 and 4 easily comes into contact with plating solutions, and is dissolved in the plating solutions, and as a result, the ceramic body 2 is eroded near the end edges 5 and 6 of the external electrodes 3 and 4. The generation of the crack 14 mentioned above can be assumed to be caused by brittleness due to the erosion.

On the other hand, in order to prevent erosion caused by plating solutions, it has been also proposed that the conductive paste for use in the formation of external electrodes is improved in composition. For example, Japanese Patent No. 4577461 (Patent Document 1) discloses a conductive paste containing glass frit in which $SiO_2$ is 7 weight % or more and 63 weight % or less. However, when the conductive paste containing the glass frit with such a composition is used to try to form external electrodes, thermal diffusion of glass into the ceramic body during heat treatment for the formation of the external electrodes diffuses the ceramic component in the glass, and there is thus a possibility that properties of the glass will be changed to decrease the dissolving resistance or acid resistance against plating solutions.

It is to be noted that while the problem mentioned above is attributed to plating solutions for use in the case of forming plating films on the external electrodes, similar problems can be also created by not only the plating solutions, but also other causes. Therefore, laminated ceramic electronic components with external electrodes subjected to no plating can encounter similar problems.

Patent Document 1: Japanese Patent No. 4577461

SUMMARY OF THE INVENTION

Accordingly, an object of the present invention is to provide a laminated ceramic electronic component and a method for manufacturing the laminated ceramic electronic component, which can solve the problems as described above.

The present invention is first directed to a laminated ceramic electronic component including: a ceramic body including a plurality of stacked ceramic layers; internal electrodes arranged along a plurality of interfaces between the ceramic layers; and an external electrode formed on the outer surface of the ceramic body to be electrically connected to the internal electrodes, the external electrode including a glass component, and in order to solve the technical problems mentioned above, the laminated ceramic electronic component is characterized in that a crystalline substance containing an element constituting the glass component included in the external electrode is present at a grain boundary between ceramic grains located at a portion of the ceramic body, which is in contact with an end edge of the external electrode.

The crystalline substance mentioned above has dissolving resistance or acid resistance against, for example, plating solutions, and suppresses ingress of plating solutions, etc. into the ceramic body.

The present invention is advantageously applied to laminated ceramic electronic components, in particular, further including a plating film formed by wet plating on an external electrode.

The crystalline substance preferably contains Ba, Ti, and Si.

The crystalline substance is preferably present in a region at a thickness of 0.5 μm or more from the interface between the external electrodes and the ceramic body toward the inside of the ceramic body. The weather resistance of the laminated ceramic electronic component can be further improved.

The glass component included the external electrode contains 40 mol % or more of BaO and/or 10 mol % or more of $TiO_2$.

The present invention is also directed to a method for manufacturing the laminated ceramic electronic component. The method for manufacturing the laminated ceramic electronic component according to the present invention includes the steps of: preparing a ceramic body including a plurality of stacked ceramic layers, with internal electrodes arranged along a plurality of interfaces between the ceramic layers; preparing a conductive paste containing a glass component; applying the conductive paste onto an outer surface of the ceramic body to be electrically connected to the internal electrodes; and forming an external electrode by heat treatment of the conductive paste.

This manufacturing method is characterized in that, according to the present invention, in order to solve the technical problems mentioned above, the step of forming the external electrode includes a step of carrying out heat treatment of the ceramic body with the conductive paste applied thereto, under a temperature condition with a top temperature of 800° C. or higher and an atmosphere condition with an electromotive force from 600 mV to 900 mV at the top temperature, and in the step of carrying out the heat treatment, the glass component in the conductive paste is caused to penetrate into a grain boundary between ceramic grains of the ceramic body, and a crystalline substance containing an element constituting the glass component is produced at a grain boundary between ceramic grains located at a portion of the ceramic body, which is in contact with an end edge of the external electrode.

The present invention is advantageously applied to methods for manufacturing laminated ceramic electronic components, in particular, further including a step of forming a plating film by wet plating on an external electrode.

In the laminated ceramic electronic component according to the present invention, the crystalline substance which has dissolving resistance against at least plating solutions is present at the grain boundary between the ceramic grains located at the portion of the ceramic body in contact with the end edge of the external electrode. Thus, for example, in the case of carrying out a plating step, the ceramic body is prevented from being eroded by plating solutions to be fragile near the end edge of the external electrode. Therefore, the generation of a crack that begins at a site with an end edge of the external electrode located as described previously with reference to FIG. 5 can be advantageously suppressed. As a result, the mechanical strength of the laminated ceramic electronic component can be enhanced.

The method for manufacturing a laminated ceramic electronic component according to the present invention can ensure the manufacture of a laminated ceramic electronic component configured characteristically as described above, that is, a laminated ceramic electronic component where a crystalline substance containing an element constituting a glass component included in an external electrode is present at grain boundaries between ceramic grains located at a portion of a ceramic body in contact with an end edge of the external electrode.

DETAILED DESCRIPTION OF THE INVENTION

As a ceramic electronic component to which the present invention is applied, a laminated ceramic capacitor will be described below by way of example.

Figure 1:
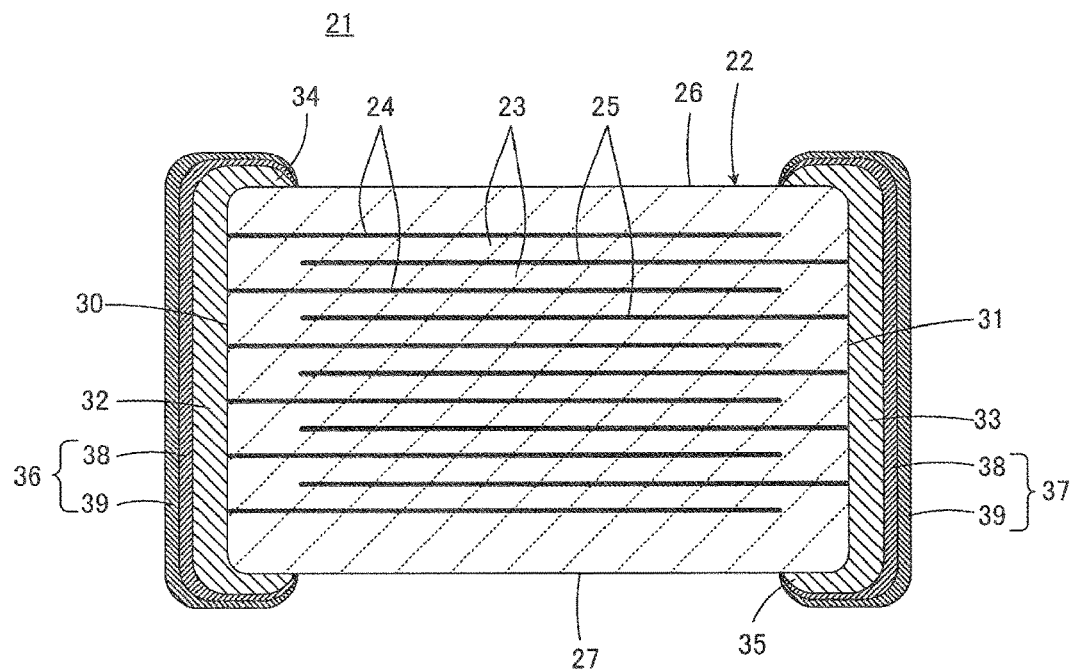
FIG. 1 is a cross-sectional view illustrating a laminated ceramic capacitor 21 as a laminated ceramic electronic component according to an embodiment of the present invention.

Referring to FIG. 1, a laminated ceramic capacitor 21 includes a ceramic body 22 that has a stacked structure composed of a plurality of ceramic layers 23. The ceramic body 22 has therein a plurality of first and second internal electrodes 24 and 25 arranged along a plurality of interfaces between the ceramic layers 23. The first internal electrodes 24 and the second internal electrodes 25 are each partially opposed to each other, and placed alternately as viewed in the stacking direction. The internal electrodes 24 and 25 contain, for example, nickel as its main constituent.

The ceramic body 22 has a substantially cuboid shape with first and second principal surfaces 26 and 27 opposed to each other, first and second side surfaces (surfaces parallel to the plane of drawing, not shown) opposed to each other, and first and second end surfaces 30 and 31 opposed to each other.

Respective ends of the first internal electrodes 24 are exposed at the first end surface 30 of the ceramic body 22.

On the first end surface 30 of the ceramic body 22, a first external electrode 32 is formed so as to be electrically connected to the respective ends of the first internal electrodes 24.

Respective ends of the second internal electrodes 25 are exposed at the second end surface 31 of the ceramic body 22. On the second end surface 31 of the ceramic body 22, a second external electrode 33 is formed so as to be electrically connected to the respective ends of the second internal electrodes 25.

The first and second external electrodes 32 and 33 have respective end edges 34 and 35 located on the principal surfaces 26 and 27 adjacent to the end surfaces 30 and 31, and further, also located on the side surfaces, not shown, in the embodiment. The external electrodes 32 and 33 are formed by applying a conductive paste onto the ceramic body 22, and subjecting the paste to heat treatment (baking), and details of the heat treatment will be described later.

Plating films 36 and 37 are formed on the external electrodes 32 and 33, respectively, if necessary. Each of the plating films 36 and 37 is composed of a nickel plating layer 38 containing nickel as its main constituent and a tin plating layer 39 formed thereon containing tin as its main constituent in this embodiment.

Next, a method for manufacturing the laminated ceramic capacitor 21 will be described.

First, the ceramic body 22 is prepared. The ceramic body 22 is obtained in such a way that a raw mother block is obtained by preparing ceramic green sheets including a dielectric ceramic material, then forming, on the ceramic green sheets, conductive paste films to serve as the internal electrodes 24 and 25 in predetermined patterns, and then stacking multiple ceramic green sheets including the ceramic green sheets with the conductive paste films formed, a plurality of raw ceramic bodies for individual laminated ceramic capacitors 21 are then obtained by cutting the mother block, and the raw ceramic bodies are subjected to firing.

The external electrodes 32 and 33 are formed on the ceramic body 22 obtained in the way described above. For the formation of the external electrodes 32 and 33, a conductive paste is prepared. The conductive paste includes a conductive metal powder, glass frit, and varnish.

For example, a copper powder with D50 of 0.5 μm 5.0 μm is used as the conductive metal powder.

As the glass frit, preferably, $SiO_2$—$B_2O_3$—$ZnO$ glass is used which contains $SiO_2$, $B_2O_3$, and $ZnO$ in proportions of 10 to 50:5 to 50:0 to 40 in terms of molar ratio. The glass frit may contain, besides $SiO_2$, $B_2O_3$, and $ZnO$, at least one selected from oxides of alkali metals, oxides of alkali-earth metals, $Al_2O_3$, $TiO_2$, and $ZrO_2$. The glass constituting the glass frit has a softening point adjusted to, for example, 550° C. to 650° C.

The content of the glass frit is preferably 18 to 22 vol % with respect to the solid content (conductive metal powder+ glass frit) in the conductive paste, in order to ensure compactness of the external electrodes 32 and 33, and fixing strength of the external electrodes 32 and 33 to the ceramic body 22.

For example, an acrylic resin dissolved in an organic solvent containing terpineol as its main constituent can be used as the varnish.

Figure 2:
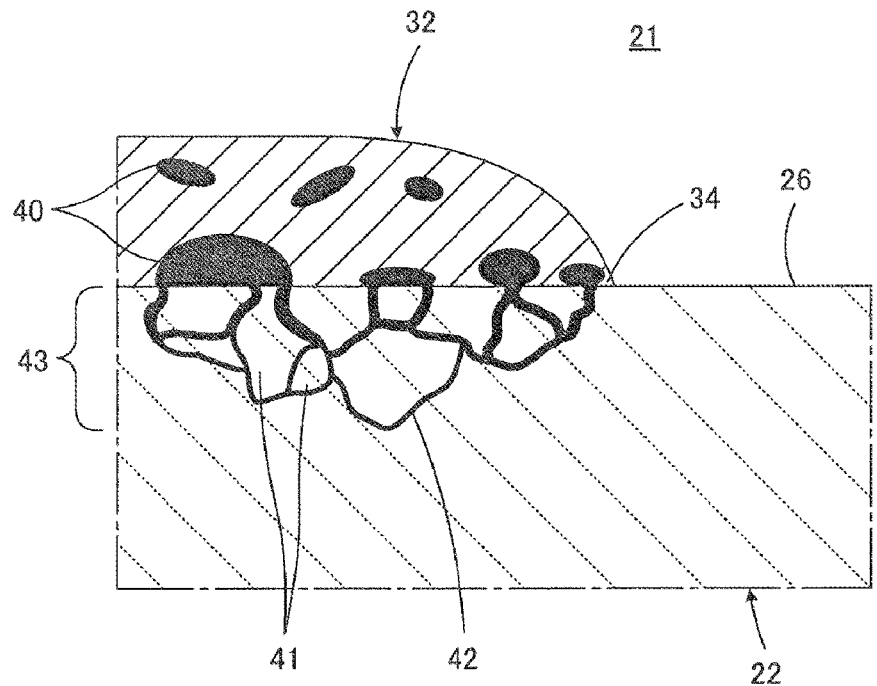
FIG. 2 is a cross-sectional view illustrating an enlarged portion of the laminated ceramic capacitor 21 shown in FIG. 1, which schematically shows a site of a ceramic body 22 with an end edge 34 of one external electrode 32 while the illustration of plating films is omitted.
Figure 6:
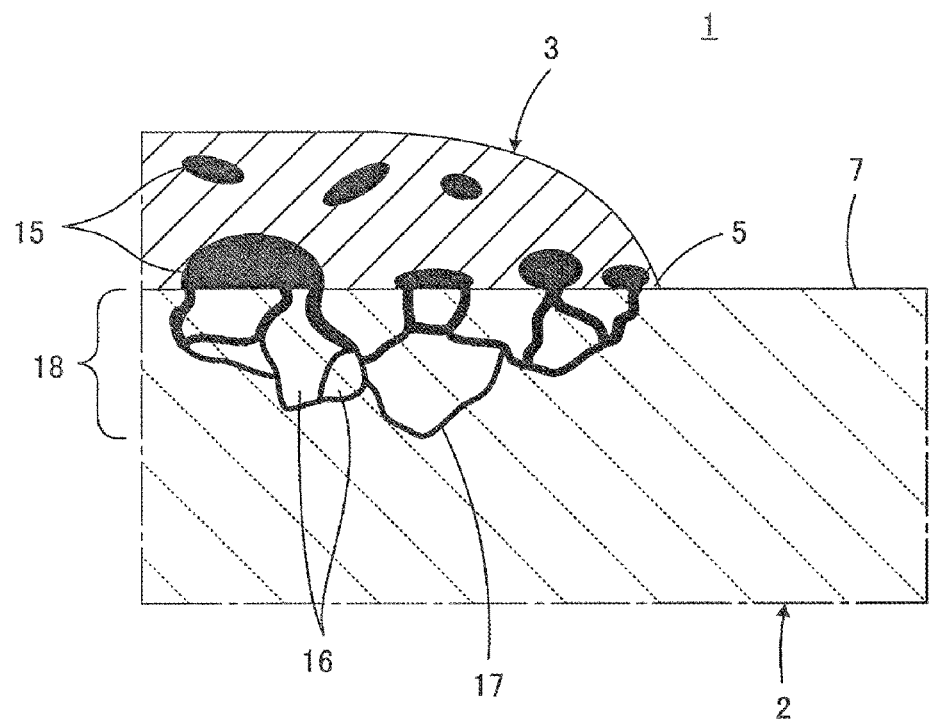
FIG. 6 is a diagram corresponding to FIG. 2, which shows an enlarged portion of the laminated ceramic capacitor 1 shown in FIGS. 4 and 5.

The conductive paste described above is applied onto the ceramic body 22 so as to be electrically connected to the internal electrodes 24 and 25, and then subjected to heat treatment (baking) to form the external electrodes 32 and 33. In the external electrodes 32 and 33 subjected to the heat treatment, a glass phase 40 is generated by the glass component included in the conductive paste as shown in FIG. 2 with reference to the external electrode 32. The glass phase 40 is distributed at more than one site in the external electrode 32. Furthermore, in the heat treatment step, the glass component in the conductive paste penetrates into boundaries 42 between ceramic grains 41 of the ceramic body 22 to form a reaction phase 43. Although not shown in FIG. 2, a similar phenomenon is also caused on the other side with the external electrode 33, as in the case of the side with the external electrode 32 as shown. The phenomena are similar to the phenomenon describer previously with reference to FIG. 6.

A feature of the present invention is that a temperature condition with a top temperature of 800° C. or higher and an atmosphere condition with an electromotive force of 600 to 900 mV at the top temperature are applied in the heat treatment step mentioned above. Through the heat treatment under these conditions, the glass component which penetrates into the grain boundaries 42 between the ceramic grains 41 of the ceramic body 22 produces a crystalline substance containing the elements constituting the glass component, as shown in FIG. 2.

The cause of the produced crystalline substance containing the elements constituting the glass component as described above, that is, the cause of the glass crystallization will be considered. The following two points are conceivable as the cause of making the glass more likely to be crystallized.

(1) As described previously, frit of $SiO_2$—$B_2O_3$—$ZnO$ glass is presumed to be used as the glass frit in the conductive paste for the formation of the external electrodes. In this case, because the conductive paste is baked under a reducing atmosphere of an electromotive of 600 to 900 mV for example, the ZnO contained in the glass composition in the conductive paste is more likely to sublimate, thereby changing the glass composition after baking the conductive paste, and making the glass more likely to be crystallized. More specifically, the vitrification range will be narrowed. In this regard, in order to make the glass more likely to be crystallized, a composition is desirable in which the $SiO_2$ content in the glass composition is 40 mol % or more, which is calculated with ZnO excluded from the glass composition in the conductive paste.

(2) When the ceramic component (Ba and Ti) present at the ceramic grain boundaries is dissolved and diffused in the glass in the external electrode, the glass is made more likely to be crystallized.

It is assumed that either one or both of the points (1) and (2) mentioned above will cause the composition of the glass in the conductive paste for the external electrodes to be changed to crystallize the glass.

As an example, when BaO and $TiO_2$ were added to $SiO_2$—$B_2O_3$ glass including 40 mol % of $SiO_2$ and 10 mol % of $B_2O_3$ to prepare glass, the following result was obtained as in Table 2, on whether the glass is crystallized or not.

TABLE 1

| Additive Amount (mol %) | | Crystallized or |
|---|---|---|
| BaO | $TiO_2$ | Not |
| 5 | 0 | Not Crystallized |
| 10 | 0 | Not Crystallized |

TABLE 1-continued

| Additive Amount (mol %) | | Crystallized or |
|---|---|---|
| BaO | TiO$_2$ | Not |
| 20 | 0 | Not Crystallized |
| 30 | 0 | Not Crystallized |
| 40 | 0 | Crystallized |
| 0 | 5 | Not Crystallized |
| 0 | 8 | Not Crystallized |
| 0 | 10 | Crystallized |
| 30 | 8 | Not Crystallized |
| 30 | 10 | Crystallized |
| 40 | 8 | Crystallized |

As can be seen in Table 1, the glass was crystallized with the addition of 40 mol % or more of BaO or 10 mol % or more of TiO$_2$.

It is to be noted that SiO$_2$, B$_2$O$_3$, BaO, and TiO$_2$ in the glass component were not changed in molar ratio even after baking the external electrodes.

As described previously, for the glass composition in the conductive paste, the SiO$_2$ content is desirably 40 mol % or more, which is calculated with ZnO excluded from composition, while several types of glass may be mixed so as to provide such a composition in total after the heat treatment (baking) for the formation of the external electrode.

In addition, silica glass (SiO$_2$) may be added into the conductive paste, but in this case, there is a need to carry out the heat treatment under such a condition that the silica glass with a high softening point and other glass are completely melted in one another. Condition setting such as the increased length of time is conceivable like, for example, holding time of 60 to 120 hours at the top temperature.

It is to be noted that the heat treatment for the formation of the external electrode may be carried out more than once, in order to sublimate ZnO from the glass component in the conductive paste, or dissolve/diffuse the ceramic grain boundary component.

Next, as shown in FIG. 1, the plating films 36 and 37 are formed on the external electrodes 32 and 33 by carrying out wet plating such as, for example, electrolytic plating. As described previously, the glass component located near the end edges 34 and 35 of the external electrodes 32 and 33, which penetrates into the grain boundaries 42 between the ceramic grains 41, is likely to come into contact with plating solutions. However, the crystalline substance produced at the grain boundaries 42 has dissolving resistance against, for example, Ni plating solutions and Sn plating solutions for use in the plating step, and brittleness of the ceramic body 22 due to erosion is thus suppressed near the end edges 34 and 35 of the external electrodes 32 and 33 in the plating step. Therefore, the generation of cracks that begin at sites with the end edges 34 and 35 of the external electrodes 32 and 33 is advantageously suppressed, and as a result, the mechanical strength of the laminated ceramic capacitor 21 can be enhanced.

When the laminated ceramic electronic component according to the present invention is the laminated ceramic capacitor 21 as shown in FIG. 1, the ceramic layers 23 are composed of a dielectric ceramic. The laminated ceramic electronic component to which the present invention is applied may be other inductor, thermistor, or piezoelectric component. Therefore, depending on the function of the laminated ceramic electronic component, the ceramic layers may be composed of a magnetic ceramic, a semiconductor ceramic, a piezoelectric ceramic, etc., in addition to a dielectric ceramic.

In addition, while the laminated ceramic capacitor 21 shown is a two-terminal capacitor including the two external electrodes 32 and 33, the present invention can be also applied to multi-terminal laminated ceramic electronic components.

Next, experimental examples will be described which were carried out according to the embodiment described above.

Experimental Example 1

(1) Preparation of Ceramic Body

Prepared was a plurality of ceramic green sheets including a ceramic material powder containing Ba and Ti as its main constituents. Next, a conductive paste containing Ni as its main constituent was applied by screen printing onto the ceramic green sheets, thereby forming conductive paste films to serve as internal electrodes.

Next, ceramic green sheets without any conductive paste film formed were stacked to reach a predetermined outer layer thickness, the ceramic green sheets with the conductive paste films formed were then stacked to provide a predetermined number of sheets, and ceramic green sheets without any conductive paste film formed were further stacked to reach a predetermined outer layer thickness, thereby providing a raw mother block capable of producing a plurality of ceramic bodies.

Next, the mother block was cut to produce a plurality of chip-like raw ceramic bodies, and the raw ceramic bodies were then subjected to firing under a reducing atmosphere in a batch furnace to obtain sintered ceramic bodies.

(2) Preparation of Conductive Paste for External Electrode

A Cu powder (D50=1.5 μm), glass frit of SiO$_2$—B$_2$O$_3$—ZnO glass with softening point: 600° C., and a varnish of an acrylic resin dissolved in an organic solvent containing terpineol as its main constituent were dispersed and mixed to obtain a conductive paste for external electrodes.

The glass frit including SiO$_2$, B$_2$O$_3$, and ZnO in proportions at 30:25:15 in terms of molar ratio was adapted so that the SiO$_2$ content in the glass composition was 40 mol %, which was calculated with ZnO excluded from the composition.

In addition, the glass content with respect to the solid content (Cu powder and glass frit) in the conductive paste was adjusted to 20 vol %.

(3) Formation of External Electrode

Next, a film composed of the conductive paste for external electrodes was formed on a surface plate to have a predetermined thickness, and ends of the ceramic body held by a holder were dipped in the conductive paste film, and then taken out of the conductive paste film to apply the conductive paste for external electrodes to both end surfaces of the ceramic body.

Then, in order to bake the conductive paste for external electrodes, the ceramic body with the formed conductive paste films for external electrodes was subjected to heat treatment in a belt furnace to form baked external electrodes on the ceramic body. In the heat treatment, the temperature condition of keeping the top temperature shown in the column "Top Temperature" of Table 2 for 5 minutes was adopted, while the atmosphere condition was adapted to an atmosphere that produces reduction power for the electromotive force shown in the column "Electromotive Force at Top Temperature" of Table 2, by adding $H_2$ into $N_2$ as a carrier gas at the top temperature.

(4) Formation of Plating Film

Ni electrolytic plating and Sn electrolytic plating were sequentially carried out to form plating films on the external electrodes.

The laminated ceramic capacitor as a sample was obtained in the way described above.

(5) Evaluation (5)-1. Observation of End Edge of External Electrode

For the polished surfaces obtained by polishing the laminated ceramic capacitors according to each sample from the surface defined by the dimension in the length direction and the dimension in the thickness direction down to ½ of the dimension in the width direction, any one point at a portion of the ceramic body in contact with an end edge of the external electrode was observed at 100000 to 200000-fold magnification with the use of a TEM (transmission electron microscope).

More specifically, mapping analysis was performed on Si and Ba at 100000 to 200000-fold magnification at the point subjected to TEM observation to distinguish grain boundaries (Si) and grains (Ba) on the ceramic body side from the interface between the external electrode and the ceramic body.

The grain boundary points found as describe above were subjected to qualitative analysis and semiquantitative analysis by point analysis. In addition, electron diffraction at the grain boundaries subjected to the point analysis was measured to determine whether the glass component entering the grain boundaries was crystallized or not.

The number of samples evaluated as described above was adjusted to 20 for each sample.

The result of the evaluation is shown in the column "Crystallized or not" of Table 2.

Further, it has been confirmed by the point analysis that the crystalline substance was an oxide containing Ba, Ti, and Si in the samples determined as "crystallized" in regard to the item "Crystallized or not".

(5)-2. Deflection Test

The laminated ceramic capacitors according to each sample were mounted with soldering onto a glass epoxy substrate, subjected to application of load at a speed of 1.0 mm/second, and kept for 5±1 seconds after the amount of deflection reached 1.5 mm.

Then, the laminated ceramic capacitors subjected to the deflection test described above were removed from the substrates, and polished from the surface defined by the dimension in the length direction and the dimension in the thickness direction to reach ½ of the dimension in the width direction. Then, portions of the ceramic bodies in contact with end edges of the external electrodes at the polished surfaces were observed for each of the two external electrodes to determine the presence or absence of cracks generated from the end edges of the external electrodes. The ratio [%] of cracked samples to the 20 samples is shown in the column "Ratio of Crack Generation by Deflection Test" of Table 2.

(5)-3. Weather Resistance Test

The laminated ceramic capacitors according to each sample were mounted on a glass epoxy substrate, and the insulation resistance was measured for the laminated ceramic capacitors before the test.

Then, the laminated ceramic capacitors according to each sample were subjected to a humidity resistance load test of leaving for 2000 hours in an atmosphere at a temperature of 70° C. and a relative humidity of 95%, while applying a rated voltage to the capacitors.

The insulation resistance was measured for the laminated ceramic capacitors after the humidity resistance load test, and compared with the insulation resistance before the test to determine the capacitors with one or more digit decreased resistance values as detective, and figure out the number of samples determined as defective among 100 samples. This number is shown in the column "Weather Resistance" of Table 2.

(5)-4. Thickness Measurement of Reaction Phase

For the polished surfaces obtained by polishing the laminated ceramic capacitors according to each sample from the surface defined by the dimension in the length direction and the dimension in the thickness direction down to ½ of the dimension in the width direction, any one point at a portion of the ceramic body in contact with an end edge of the external electrode was observed at 10000 to 20000-fold magnification.

Figure 3:
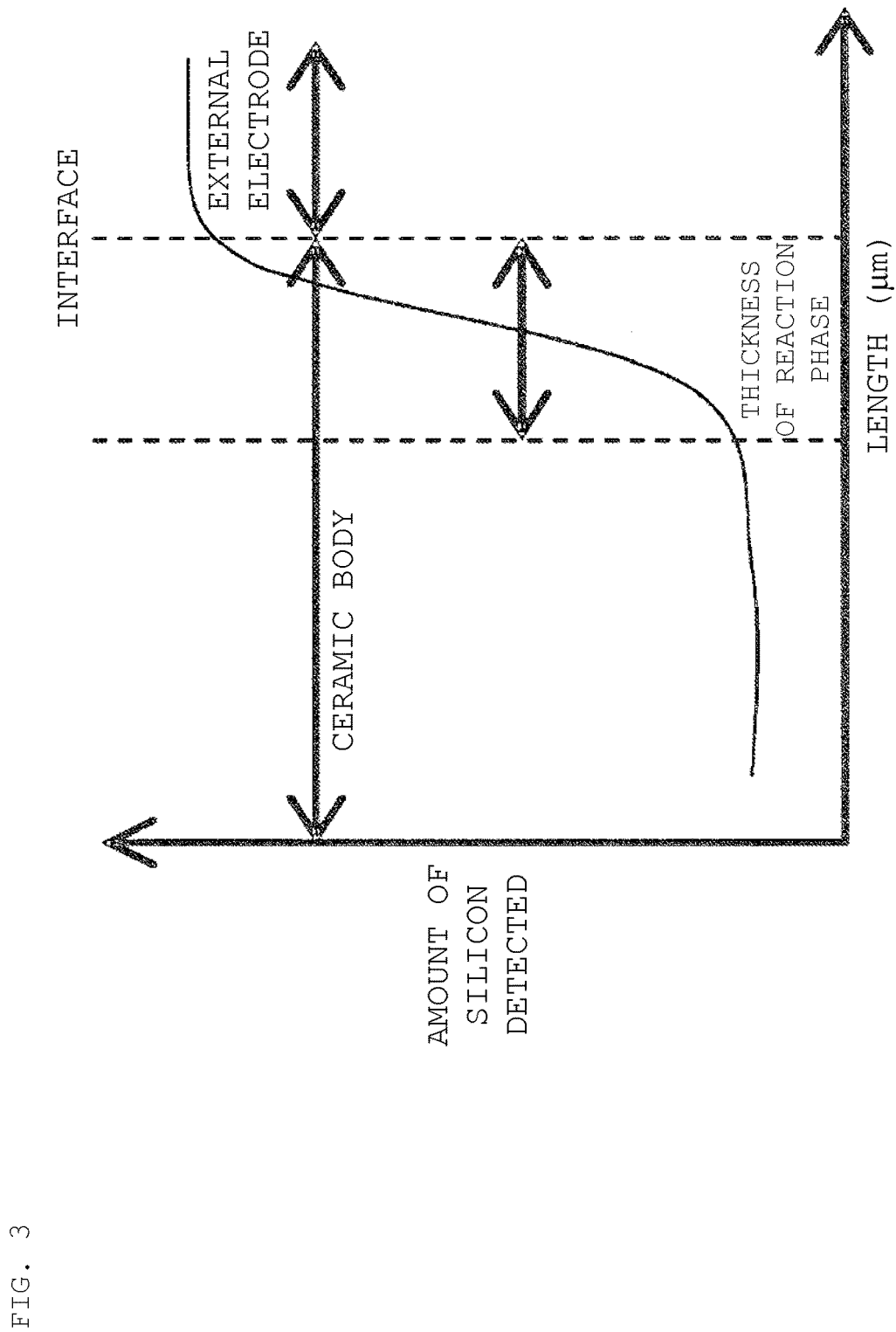
FIG. 3 is a diagram for explaining the thickness of a reaction phase, obtained in an experimental example.
Figure 4:
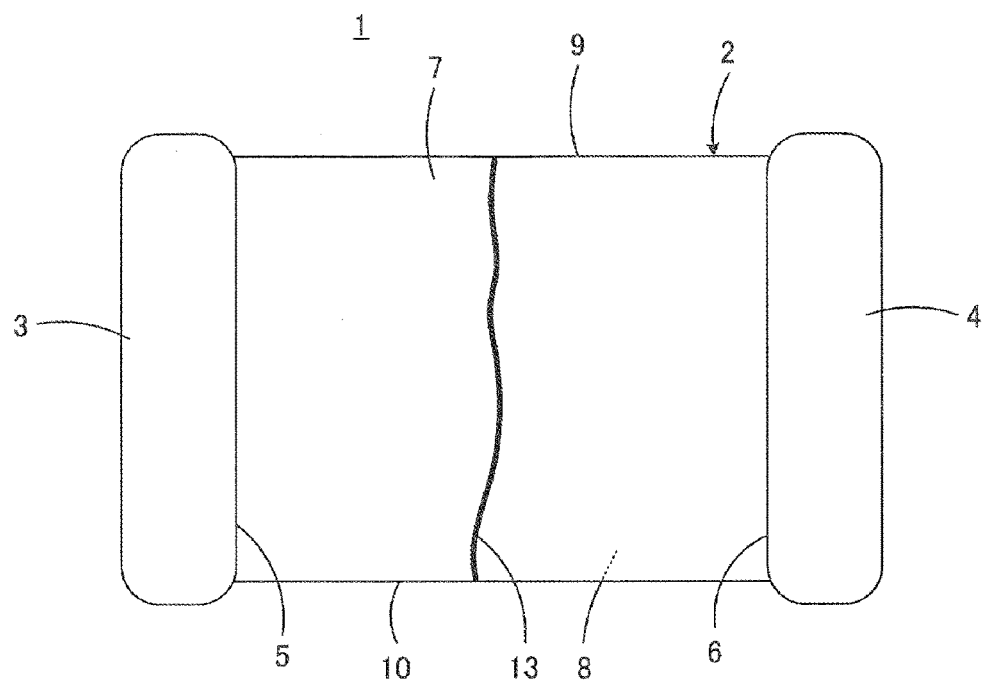
FIG. 4 is a plan view illustrating a laminated ceramic capacitor 1 before plating with a crack 13 formed, for explaining a problem to be solved by the present invention.
Figure 5:
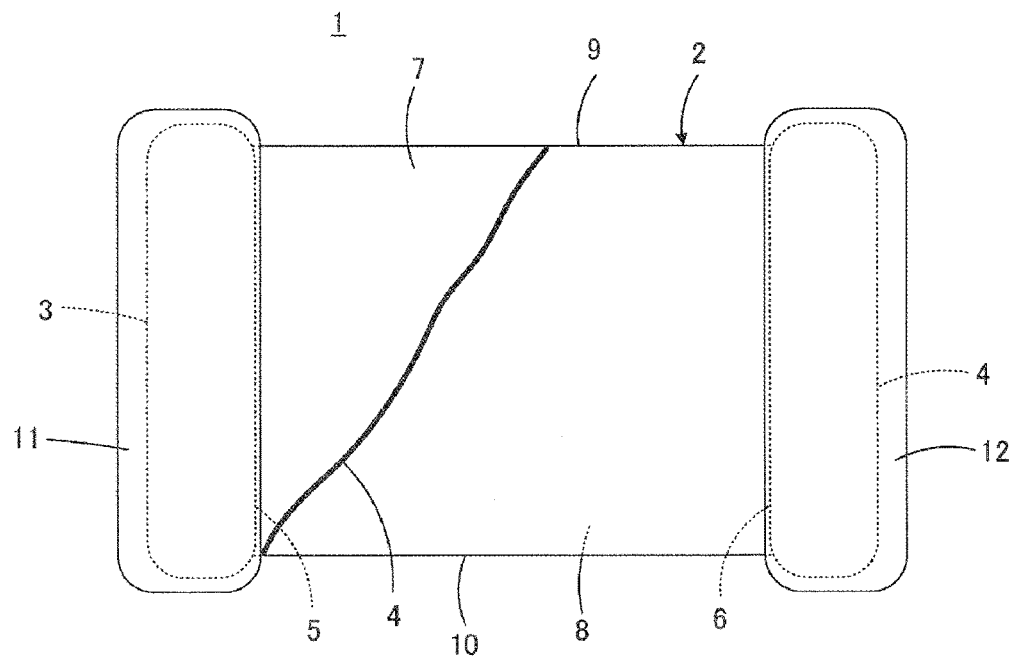
FIG. 5 is a plan view illustrating the laminated ceramic capacitor 1 after plating with a crack 14 formed, for explaining the problem to be solved by the present invention.

The observed point was subjected to line analysis in the thickness direction of the reaction phase to obtain the concentration distribution of silicon, thereby providing the result of the analysis as shown in FIG. 3, and the silicon concentration gradient shown in FIG. 3 was then checked to figure out the thickness of the reaction phase. The average value for 5 samples is shown in the column "Thickness of Reaction Phase" of Table 2.

TABLE 2

| Sample Number | Crystallized or Not | Electromotive Force at Top Temperature (mV) | Top Temperature (° C.) | Weather Resistance | Ratio of Crack Generation by Deflection Test (%) | Thickness of Reaction Phase (μm) |
|---|---|---|---|---|---|---|
| *1 | Not Crystallized | 500 | 750 | 65 | 10 | 0.5 |
| 2 | Crystallized | 600 | 750 | 25 | 0 | 0.6 |
| 3 | Crystallized | 800 | 750 | 14 | 0 | 0.5 |
| 4 | Crystallized | 900 | 750 | 7 | 0 | 0.5 |
| *5 | Not Crystallized | 500 | 800 | 0 | 60 | 0.5 |
| *6 | Not Crystallized | 500 | 850 | 0 | 40 | 0.7 |
| *7 | Not Crystallized | 500 | 900 | 0 | 30 | 3.5 |

TABLE 2-continued

| Sample Number | Crystallized or Not | Electromotive Force at Top Temperature (mV) | Top Temperature (° C.) | Weather Resistance | Ratio of Crack Generation by Deflection Test (%) | Thickness of Reaction Phase (μm) |
|---|---|---|---|---|---|---|
| *8 | Not Crystallized | 500 | 950 | 0 | 10 | 10.0 |
| 9 | Crystallized | 600 | 800 | 0 | 0 | 0.6 |
| 10 | Crystallized | 600 | 850 | 0 | 0 | 3.7 |
| 11 | Crystallized | 600 | 900 | 0 | 0 | 6.5 |
| 12 | Crystallized | 600 | 950 | 0 | 0 | 10.0 |
| 13 | Crystallized | 800 | 800 | 0 | 0 | 0.5 |
| 14 | Crystallized | 800 | 850 | 0 | 0 | 2.4 |
| 15 | Crystallized | 800 | 900 | 0 | 0 | 5.6 |
| 16 | Crystallized | 800 | 950 | 0 | 0 | 9.0 |
| 17 | Crystallized | 900 | 800 | 3 | 0 | 0.4 |
| 18 | Crystallized | 900 | 850 | 0 | 0 | 1.2 |
| 19 | Crystallized | 900 | 900 | 0 | 0 | 2.5 |
| 20 | Crystallized | 900 | 950 | 0 | 0 | 5.0 |

In Table 2, the sample numbers marked with a symbol of * correspond to samples of comparative examples outside the scope of the present invention.

The samples 2 to 4 and 9 to 20 determined as "Crystallized" in regard to the item "Crystallized or not" within the scope of the present invention have achieved 0% in "Ratio of Crack Generation by Deflection Test". This is assumed to be because the crystalline substances generated in the samples 2 to 4 and 9 to 20 were not dissolved in the plating solutions, and for the confirmation of the assumption, the dissolving resistance against the plating solutions was evaluated in the following way.

As described previously, for the polished surfaces of the samples polished from the surface defined by the dimension in the length direction and the dimension in the thickness direction down to ½ of the dimension in the width direction, a portion of the ceramic body in contact with an end edge of the external electrode was observed at 10000-fold magnification with the use of a FE-SEM (field emission scanning electron microscope), and then after the same samples were each immersed for 2 hours in a Ni plating solution at 60° C., and for 1 hour in a Sn plating solution at 25° C., the portion of the ceramic body in contact with the end edge of the external electrode was observed again with the use of the FE-SEM for the polished surfaces. Then, the dissolving resistance of the crystallized glass component against the plating solution was evaluated from the change between the FE-SEM images before and after the immersion in the plating solutions. As a result, it has been confirmed that the crystalline substances generated in the samples 2 to 4 and 9 to 20 are not dissolved in the plating solutions.

In contrast, the samples 1 and 5 to 8 determined as "Not crystallized" in regard to the "Crystallized or not" outside the scope of the present invention failed to achieve 0% in "Ratio of Crack Generation by Deflection Test". The "Electromotive Force at Top Temperature" was 500 mV in the case of the samples 1 and 5 to 8.

Further, in the case of the samples 1 to 4, the "Top Temperature" was 750° C., which is lower than 800° C. As just described, in the case of the "Top Temperature" lower than 800° C., the "Weather Resistance" was decreased even when the "Electromotive Force at Top Temperature" was changed in the range of 500 to 900 mV, because of low compactness of the external electrodes. In the case of the samples 1 to 4, there is a developed tendency for the "Weather Resistance" to be more favorable as the "Electromotive Force at Top Temperature" is further increased, that is, as the reduction power in the heat treatment atmosphere is further strengthen.

In addition, when attention is paid to the "Top Temperature" and "Electromotive Force at Top Temperature", the laminated ceramic capacitor samples with the "Top Temperature" of 800° C. or higher and the "Electromotive Force at Top Temperature" in the range of 600 to 900 mV ensure "Crystallized" in "Crystallized or not" and 0% in "Ratio of Crack Generation by Deflection Test".

When attention is paid to the "Thickness of Reaction Phase", it has been determined that the thickness is preferably 0.5 μm or more. In the case of the sample 17, the "Thickness of Reaction Phase" was 0.4 μm, and 3 defectives were produced in terms of "Weather Resistance".

DESCRIPTION OF REFERENCE SYMBOLS 21 laminated ceramic capacitor
22 ceramic body
23 ceramic layer
24, 25 internal electrodes
32, 33 external electrodes
34, 35 end edges of external electrodes
36, 37 plating films
40 glass phase
41 ceramic grain
42 grain boundary
43 reaction phase

The invention claimed is:
1. A laminated ceramic electronic component comprising:
a ceramic body comprising a plurality of stacked ceramic layers;
internal electrodes arranged along a plurality of interfaces between adjacent ceramic layers of the plurality of stacked ceramic layers; and
an external electrode on an outer surface of the ceramic body and electrically connected to the internal electrodes, the external electrode including a glass component,
wherein a crystalline substance containing an element constituting the glass component included in the external electrode is present at a grain boundary between ceramic grains located at a portion of the ceramic body, which is in contact with an end edge of the external electrode, and wherein the crystalline substance contains Ba, Ti, and Si.

2. The laminated ceramic electronic component according to claim 1, further comprising:

a plating film formed by wet plating on the external electrode.

3. The laminated ceramic electronic component according to claim 2, wherein the crystalline substance has dissolving resistance against a plating solution used to form the plating film on the external electrode.

4. The laminated ceramic electronic component according to claim 1, wherein the crystalline substance is present in a region at a thickness of 0.5 μm or more from an interface between the external electrode and the ceramic body toward an inside of the ceramic body.

5. The laminated ceramic electronic component according to claim 1, wherein the glass component included in the external electrode contains 40 mol % or more of BaO.

6. The laminated ceramic electronic component according to claim 1, wherein the glass component included in the external electrode contains 10 mol % or more of $TiO_2$.

7. The laminated ceramic electronic component according to claim 1, wherein the glass component has a softening point of 550° C. to 650° C.

8. The method for manufacturing a laminated ceramic electronic component according to claim 1, wherein the glass component has a softening point of 550° C. to 650° C.

9. A method for manufacturing a laminated ceramic electronic component, the method comprising:

preparing a ceramic body comprising a plurality of stacked ceramic layers, and having internal electrodes arranged along a plurality of interfaces between adjacent ceramic layers of the plurality of stacked ceramic layers;

preparing a conductive paste including a glass component;

applying the conductive paste on an outer surface of the ceramic body; and forming an external electrode electrically connected to the internal electrodes by carrying out a heat treatment of the conductive paste under a temperature condition with a top temperature of 800° C. or higher and an atmosphere condition with an electromotive force from 600 mV to 900 mV at the top temperature such that the glass component in the conductive paste is caused to penetrate into a grain boundary between ceramic grains of the ceramic body, and a crystalline substance containing an element constituting the glass component is produced at the grain boundary between ceramic grains located at a portion of the ceramic body, which is in contact with an end edge of the external electrode.

10. The method for manufacturing a laminated ceramic electronic component according to claim 9, the method further comprising:

forming a plating film by wet plating on the external electrode.

11. The method for manufacturing a laminated ceramic electronic component according to claim 10, wherein the crystalline substance has dissolving resistance against a plating solution used to form the plating film on the external electrode.

12. The method for manufacturing a laminated ceramic electronic component according to claim 9, wherein the crystalline substance contains Ba, Ti, and Si.

13. The method for manufacturing a laminated ceramic electronic component according to claim 9, wherein the crystalline substance is produced in a region at a thickness of 0.5 μm or more from an interface between the external electrode and the ceramic body toward an inside of the ceramic body.

14. The method for manufacturing a laminated ceramic electronic component according to claim 9, wherein the glass component included in the external electrode contains 40 mol % or more of BaO.

15. The method for manufacturing a laminated ceramic electronic component according to claim 9, wherein the glass component included in the external electrode contains 10 mol % or more of $TiO_2$.

* * * * *